(12) United States Patent
Arora et al.

(10) Patent No.: US 8,285,290 B2
(45) Date of Patent: Oct. 9, 2012

(54) OPTIMIZED RESOURCE ALLOCATION FOR WIRELESS DEVICE IN PACKET TRANSFER MODE

(75) Inventors: Dinesh Kumar Arora, Waterloo (CA); David Philip Hole, Slough (GB)

(73) Assignee: Research In Motion Limited, Waterloo, Ontario (CA)

( * ) Notice: Subject to any disclaimer, the term of this patent is extended or adjusted under 35 U.S.C. 154(b) by 311 days.

(21) Appl. No.: 12/621,401

(22) Filed: Nov. 18, 2009

(65) Prior Publication Data
US 2011/0116470 A1 May 19, 2011

(51) Int. Cl.
*H04W 36/14* (2009.01)
(52) U.S. Cl. .................................. 455/438; 370/331
(58) Field of Classification Search .................. 455/436, 455/438, 445, 464; 370/331, 338
See application file for complete search history.

(56) References Cited

U.S. PATENT DOCUMENTS

| | | | | |
|---|---|---|---|---|
| 8,072,933 B2* | 12/2011 | Marinescu et al. | ........... | 370/331 |
| 2005/0105503 A1* | 5/2005 | Cayla et al. | ................... | 370/346 |
| 2007/0129088 A1* | 6/2007 | Gao et al. | ...................... | 455/464 |
| 2008/0096567 A1* | 4/2008 | Rajala et al. | .................. | 455/438 |
| 2010/0278105 A1* | 11/2010 | Diachina et al. | ............. | 370/328 |
| 2010/0332934 A1* | 12/2010 | Hole et al. | ..................... | 714/748 |
| 2011/0103311 A1* | 5/2011 | Navratil et al. | ............... | 370/328 |
| 2011/0105158 A1* | 5/2011 | Arora et al. | ................... | 455/466 |
| 2011/0116474 A1* | 5/2011 | Arora et al. | ................... | 370/331 |

* cited by examiner

*Primary Examiner* — Kamran Afshar
*Assistant Examiner* — Khawar Iqbal
(74) *Attorney, Agent, or Firm* — Quarles & Brady LLP

(57) ABSTRACT

A system and method allows a network, in response to a cell reselection notice, to serve a wireless, wireless device sufficient data to complete a pending data transfer instead of performing the immediate cell change. Appropriate allocation of radio resources to the wireless device in the current serving cell and before cell change allows reduced packet data transfer latencies for small data sessions, better load balancing and traffic resourcing between cells, appropriate allocation of uplink resources in the new target cell, and enhanced control over network congestion.

25 Claims, 9 Drawing Sheets

OPTIMIZED RESOURCE ALLOCATION FOR WIRELESS DEVICE IN PACKET TRANSFER MODE

BACKGROUND

The present disclosure relates generally to systems and methods for communications between a wireless device and a network and, more particularly, to systems and methods for coordinating communications during a wireless device changing between cells of a network.

As used herein, the term wireless device can refer to a variety of wireless devices such as mobile telephones, personal digital assistants (PDAs), handheld or laptop computers, and similar devices, including mobile stations (MS), user agent (UA), or user equipment (UE) that have telecommunications capabilities. In some embodiments, a wireless device may refer to a mobile, wireless device. The term wireless device may also refer to devices that have similar capabilities but that are not generally transportable, such as desktop computers, set-top boxes, or network nodes.

A wireless device may operate in a wireless communication network that provides high-speed data and/or voice communications. For example, the wireless device may operate in accordance with one or more of an Enhanced Universal Terrestrial Radio Access Network (E-UTRAN), Universal Terrestrial Radio Access Network (UTRAN), Global System for Mobile Communications (GSM) network, Evolution-Data Optimized (EV-DO), Digital Enhanced Cordless Telecommunications (DECT), Digital AMPS (IS-136/TDMA), Integrated Digital Enhanced Network (iDEN), Universal Mobile Telecommunications System (UMTS), Enhanced Data rates for GSM Evolution (EDGE), GSM/EDGE Radio Access Network (GERAN) and General Packet Radio Service (GPRS) technology. Other wireless networks that wireless devices may operate in include but are not limited to Code Division Multiple Access (CDMA), cdma2000, cdma2000 1xRTT, cdma2000 HRPD, WLAN (e.g. IEEE 802.11) and WRAN (e.g. IEEE 802.22). wireless devices may also operate in fixed network environments such as, for example, Digital Subscriber Line (xDSL) environments, Data Over Cable Service Interface Specification (DOCSIS) cable networks, Wireless Personal Area Networks (PAN), Bluetooth, ZigBee, Wireless Metropolitan Area Networks (MAN) (e.g., WiMAX, IEEE 802.20, IEEE 802.22 Ethernet) or optical networks.

In wireless telecommunications systems, transmission equipment in a base station transmits signals throughout a geographical region known as a cell. Thus, each geographical region is serviced by a number of cells, often in an at least partially-overlapping arrangement. The process for deciding when and how a wireless device changes cells can be dictated by a number of variables, including specific communications technology utilized by the wireless device, the cells, and the overall network. For example, cells utilizing GERAN technology may utilize a variety of network control modes, including a purely autonomous (NC0) cell change mode, a partially autonomous (NC1) cell change mode, and a network controlled (NC2) cell change mode.

Regardless of the particular protocols utilized, while performing a "Cell Reselection," there is typically a delay in packet data transfer, as some amount of time is used to perform switching and signaling operations in the new cell. In the case where a wireless device is in the process of a data transfer during a Cell Reselection, the delay can be readily appreciable by the user because the data transfer may be interrupted and delayed. This situation can be particularly prevalent because the network may assist or control the cell change, but is not aware of the amount of data that the wireless device wants to transmit. Based on the rough estimates, the network, depending upon protocol and implementation, can estimate the resource allocation desired by the wireless device to finish an in-process data transfer and, hence, delay the cell reselection process until the wireless device can complete the in-process data transfer. However, if the rough estimate by the network is incorrect or insufficient, there may still be a user-perceivable delay. This accuracy of the estimate may be very low because the network has very little information (especially at the entity such as the BSS which determines when to trigger cell change) on which to base its estimate.

For example, turning to FIGS. 1 and 2, this scenario can be readily illustrated. In particular, FIG. 1 is a schematic illustration of a wireless device 10 that is associated with a serving cell 12 and moving to a target cell 14. Also, FIG. 2 illustrates a sequence diagram for communications between a wireless device 10 and the network as the wireless device 10 "moves" from the serving cell 12 to the target cell 14. It is noted that a wireless device 10 may "move" from the serving cell 12 to the target cell 14 without a physical move. That is, the wireless device 10 may remain in the same location, yet change cells.

More particularly, FIG. 2 illustrates an example of a wireless device 10 and network implementing an NACC procedure in the case of 100 Radio Link Control (RLC) data blocks pending for transmission at the wireless device 10 side to the network when changing from communication through the serving cell 12 to the target cell 14 using a cell change notification (CCN) mode. In this example, the wireless device 10 is assigned 4 uplink (UL) timeslots and is using Modulation and Coding Scheme (MCS)-9 with RLC Acknowledged mode. It is noted that, for simplicity, Uplink Ack/Nack blocks from the network are not shown in FIG. 2. The transmission of these (and other control messages) may reduce the available resources for sending RLC data blocks.

In this situation, the wireless device 10 is under a good coverage of the serving cell 12, has established an Uplink temporary block flow (TBF) 16, and successfully transmitted an initial set of RLC data blocks 18. After that, the wireless device 10 determines that the cell reselection criteria 20 are met and successfully transmits "Packet Cell Change Notification" message 22 to the network through its connection in the serving cell 12. This Packet Cell Change Notification message 22 contains the current serving cell measurement and the identity of the proposed target cell 14. The wireless device 10 keeps transmitting uplink data 26 to the network through the serving cell 12 until the wireless device 10 receives system information applicable to the target cell 14 by means of one or more Packet Neighbour Cell Data messages 27 and "Packet Cell Change Continue" message 28 from the network. At this stage, the wireless device 10 suspends the TBF operation 30 in the serving cell 12 and performs the following sequence of steps: synchronizing with the target cell 14 frequency and frame boundaries and identifying the random access channels (RACH) and making a RACH Request 32; receiving an Immediate Assignment 34 and waiting for an allocated TBF starting time; at the TBF starting time, performing a "Packet Resource Request" 36, and optionally, receiving a "Packet Uplink Assignment" 38; and based on the allocated uplink state flag (USF) and temporary flow indicator (TFI), aborting the TBF at the serving cell 12 and starting a new TBF 40 with the target cell 14. In a congested cell and as per current 3GPP configuration, though unlikely, it is theoretically possible for the wireless device 10 to take up-to 10 seconds to achieve the actual transmission of the uplink data and complete transmitting the uplink data 42 or to determine that the cell change has failed and return to the previous serving cell. This amount of latency may be significantly visible to the end user, especially for a small data session like web browsing or sending an email.

Turning to FIG. 3, a similar data flow diagram to that of FIG. 2 is illustrated; however, this time the wireless device 10 and network are changing from communication through the serving cell 12 to the target cell 14 using a network ordered cell change (for example, in NC1 or NC2 mode). In this case, additional latencies may be observed during packet data transfer as, after the cell reselection, the wireless device 10 has to receive consistent system information set in the target cell 14 before triggering the two phase packet access procedure since in this example this information was not received while in the serving cell 12. Specifically, the wireless device 10 has established a TBF 16, successfully transmitted 27 RLC/MAC BSN 18, and sent Packet Measurement Report 44, before continuing with transmission of uplink data 46. However, when the wireless device 10 receiving a Packet Cell Change Order message 48, the wireless device 10 shall obey the Packet Cell Change Order irrespective of whether or not the wireless device 10 has any knowledge of the relative synchronization of the target cell 14 to the serving cell 12. Thus, the wireless device 10 suspends TBF and initiates cell reselection 50. As per the 3GPP specifications, the wireless device 10 must wait for the completion of the System Information Acquisition 52, which can theoretically last for up to T3174 (=15 s). Hence, in NCCC/NC2 mode it is possible to have a latency of up to 20 seconds (T3174+T3168) for the resumption of data transfer either in the new cell or (if the cell change is not successful) in the original cell.

The current solution in the 3GPP specification provides a limited estimate of wireless device resource requirement to the network by using the Countdown value (CV) transmitted in the RLC Data Blocks. It should also be noted that the CV value is only useful when the amount of data remaining in the buffer is very small; specifically, less than or equal to the number that would be transmitted within BS_CV_MAX radio block periods using the full uplink assignment of the mobile station. If more than this amount of data is to be transmitted, the CV value indicates a single value regardless of the amount of data. Because of this definition of the CV value, it is unlikely to be useful to indicate an amount of data that could be sent within the existing time limit for reselection. In particular, the BS_CV_MAX typically indicates the round-trip delay from wireless device to BSS and hence it is possible that such very small amounts of data would be sent anyway before the PCCC/PSHO/PCCO has been received by the wireless device.

Also, the wireless device informs the network about the uplink resource requirements using Packet Resource Request Message. But this message is transmitted by the wireless device when a different priority/different PFI based upper layer PDUs needs to be transmitted. For the data running with the same QoS and PFI, the Packet Resource Request may not be generated by the wireless device and, hence, the network will not be aware of the number of data bytes that the wireless device wants to transmit before the reselection procedure.

Thus, systems and methods that address the above-listed issues and allow the setting and the usage of optimal resource allocation for cell reselection would provide a useful improvement in the art.

BRIEF DESCRIPTION OF THE DRAWINGS

In the accompanying drawings, like reference numerals represent like parts or operations.

DETAILED DESCRIPTION

Figure 1:
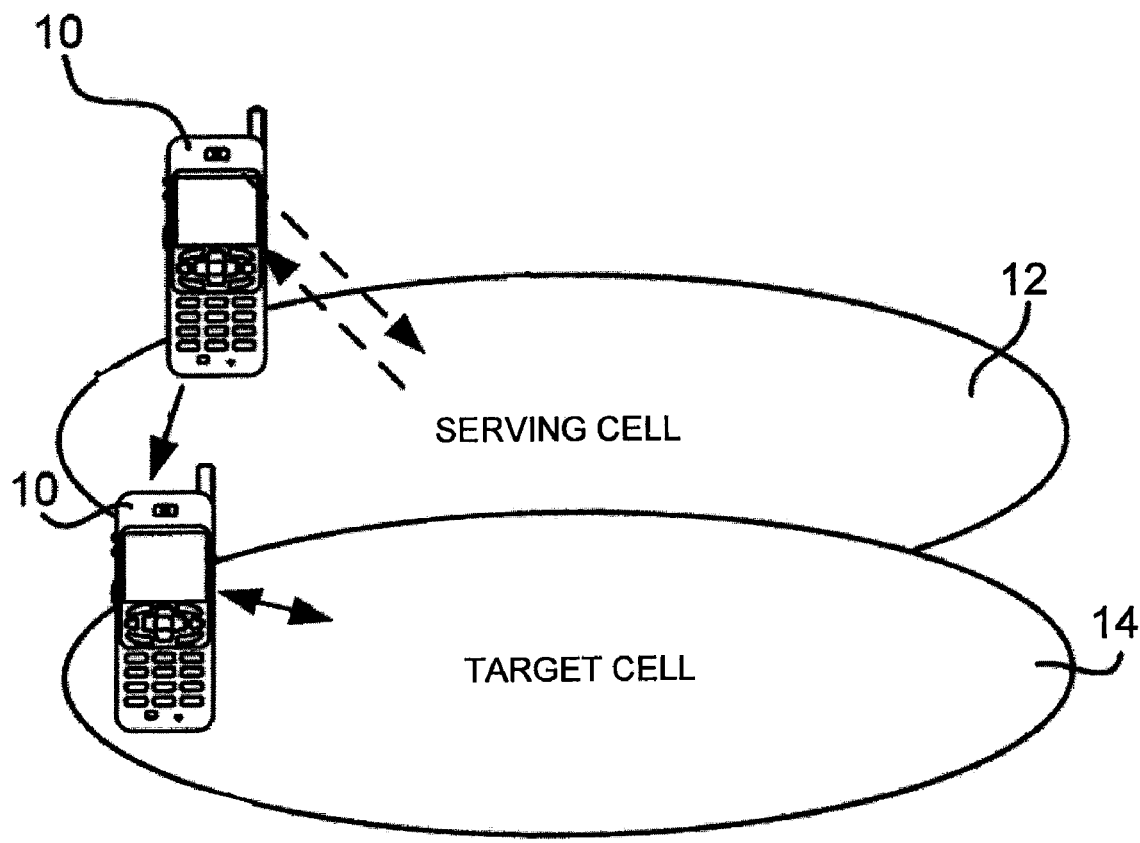
FIG. 1 is an illustration of an example schematic diagram of a wireless device and associated network.

The present disclosure provides a method for performing a cell reselection on a wireless device associated with a network including a first communications cell and a second communications cell includes initiating a temporary block flow (TBF) to transfer a series of data blocks through the first communications cell. The method also includes identifying an occurrence of a cell reselection criteria and determining a remaining number of data blocks needed to complete the TBF through the first communications cell. Furthermore, the method includes communicating a cell change notification to the network including an indication of the remaining number of data blocks needed to complete at least a selected portion of the TBF through the first communications cell and completing at least the selected portion of the TBF through the first communications cell using the remaining number of data blocks. Also, the method includes receiving an cell change message from the network and performing a cell reselection protocol to connect to the second communications cell.

The disclosure also includes a method for performing a cell reselection with a wireless device associated with a network including a first communications cell and a second communications cell includes receiving a temporary block flow (TBF) including a series of data blocks from the wireless device through the first communications cell. The method also includes receiving measurement reports from the wireless device through the first communications cell, identifying an occurrence of a cell reselection criteria, and using the measurement reports received from the wireless device, determining a remaining number of data blocks needed to complete the TBF through the first communications cell. Furthermore, the method includes communicating a cell change order after receiving at least a selected portion of the TBF through the first communications cell and performing a cell reselection protocol to connect the wireless device to the second communications cell.

In addition the disclosure includes a method for performing a cell reselection with a wireless device associated with a network including a first communications cell operating according to a first communications protocol and a second communications cell operating according to a second communications protocol includes initiating a temporary block flow (TBF) to transfer a series of data blocks through the first communications cell. The method also includes identifying an occurrence of a cell reselection criteria, determining a remaining number of data blocks needed to complete the TBF through the first communications cell, and communicating a cell change notification to the network including an indication of the remaining number of data blocks needed to complete at least a selected portion of the TBF through the first communications cell. Furthermore, the method includes completing at least the selected portion of the TBF through the first communications cell using the remaining number of data blocks, receiving a handoff command from the network, and performing a cell reselection protocol to connect to the second communications cell.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present disclosure provides a system and method for providing a network with an indication of the amount of data that a wireless device has currently buffered or expects to send imminently (e.g. within the maximum allowed delay for cell selection) for the ongoing data transfer. Alternatively and particularly if there is a large amount of data to be sent, the wireless device may indicate an amount of data which, if sent before the cell change, would enhance the user's experience, for example allowing the wireless device to transfer all of the data required to completely send one or more complete upper layer PDUs or, for example, to send the remaining contents of a file or files for which transfer has been initiated or requested by the user. Preferably, the indication takes into account any headers or additional overhead generated by layers above the layer (e.g., the RLC layer) at which the indication is signalled (since the network entity processing the indication may not be aware of which protocols are in operation above the RLC protocol and/or their structure/frame format etc.).

The wireless device may also indicates which (if any) higher layer protocols (noting that a TBF might carry traffic using multiple higher layer protocols, possibly even from different applications) involved in the uplink transfer are operating in acknowledged mode and, as such, may generate response acknowledgement information (and/or trigger retransmissions) during the uplink transfer or even after the indicated amount of data has been transferred in the uplink. This indication may simply indicate either that: i) all higher layer protocols are unacknowledged or that ii) one or more higher layer protocols are acknowledged. A further distinction may be made according to the logical termination points of the respective protocols, for example, between protocols operating between the wireless device and network elements under control of the serving operator and protocols which terminate outside of the serving operator's network. This is beneficial as the round-trip time for the former will be lower, and may even be relatively accurately known, than for the latter, which is unlikely to be known. This indication may be sent at the same time as, or independently from any indication of an amount of data, or may not be sent. The network preferably uses these indications in its determination as to when to trigger cell reselection, for example, by using them to estimate whether it will be able to allocate resources sufficient to complete the requested uplink transfer before the maximum time permitted expires, taking into account (downlink) acknowledgement information or (uplink) retransmissions that might need to be transmitted according to higher layer protocols. The network may also use these [protocol is ACKed] indications in other cases, such as determining when or whether to reduce resource allocation or assignments or reduction of downlink reception required by the wireless device.

Based on this indication, the network may schedule sufficient uplink resources to ensure the data can be sent before the reselection occurs, or, trigger the reselection to continue not before all data is sent, and preferably either as soon as all the data is sent or with some appropriate delay, taking into account possible higher layer responses. As will be explained, to do so, the wireless device transmits a current "RLC_BUFFER_SIZE" field to the network during Network Controlled/Assisted cell change. The RLC_BUFFER_SIZE field indicates the size of the data pending with the wireless device for transmission.

Alternatively, the network may determine that cell change should happen as soon as possible, in particular, if the network determines that the wireless device is moving fast. This may be determined by comparison of recent measurement reports from the wireless device, trends in the block error rate or bit error rate for blocks received from the wireless device, or by a specific indication by the wireless device, such as communicated in the PCN message. The wireless device may determine to set this indication based on the change in measured signal strength of the serving cell over time, or other applicable methods.

The wireless device may indicate that it should or wishes, or believes it to be beneficial from a battery consumption and/or user-perceived performance point of view, perform the cell change without delay for uplink data transfer. For example, this may occur because the wireless device determines that it is moving fast and will soon suffer very poor throughput in the serving cell. In any case, the wireless device may communicate such by omitting to include the RLC_BUFFER_SIZE indication, by setting it to zero, or by an explicit indication, such as by using a specific bit that is so designated.

Figure 2:
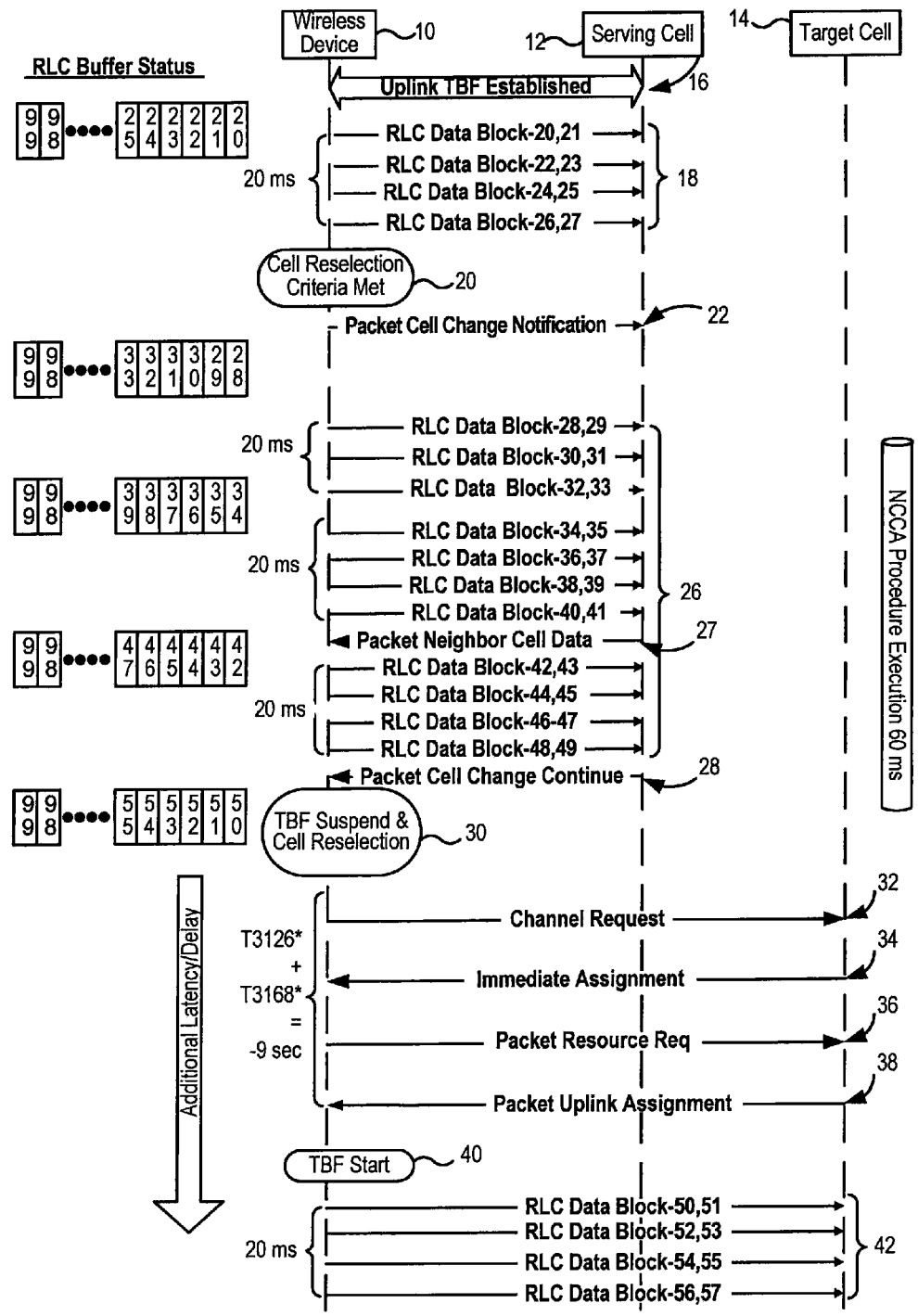
FIG. 2 is a data flow diagram illustrating an example data flow for a prior-art cell reselection process operating according to an NACC/NC1 change mode.
Figure 3:
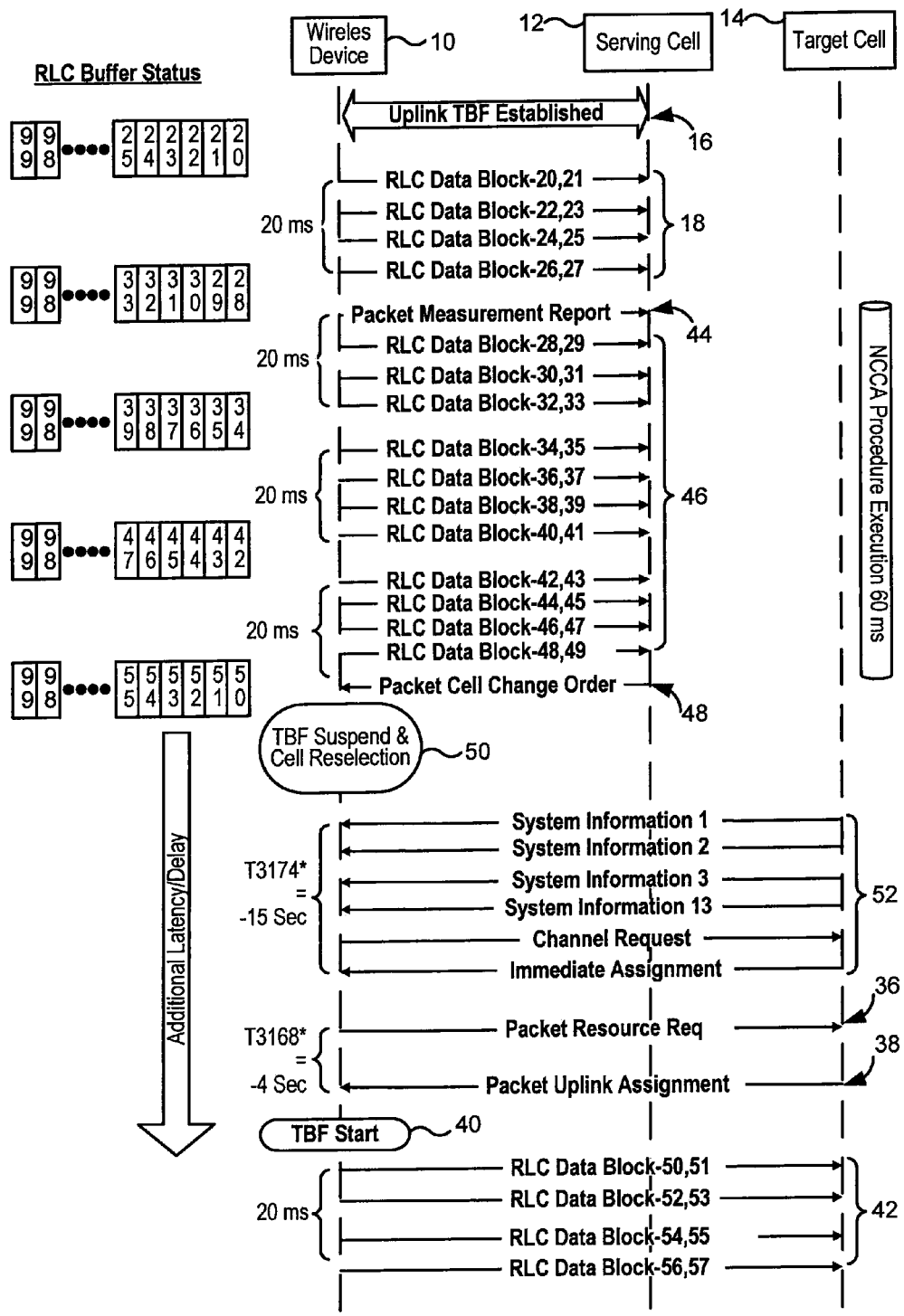
FIG. 3 is a data flow diagram illustrating an example data flow for a prior-art cell reselection process operating according to an NCCC/NC2 change mode.

By way of example, the present disclosure will detail operation in a variety of cell change modes. Turning first to the case where reselection may be triggered by the wireless device and such reselection is notified to the network (e.g. NC0 or NC1, with CCN enabled) and referring to FIG. 4, a data flow diagram similar to that of FIG. 2 is illustrated. However, unlike the standard protocol illustrated in FIG. 2, according to the present disclosure, when the wireless device 10 identifies that a cell reselection criteria has been met 20, the wireless device 10 transmits Packet Cell Change notification message 22 to the network and includes the measurement for the proposed neighbor cells. However, in this case, the wireless device 10 includes another field called "RLC_BUFFER_SIZE" inside the Packet Cell Change Notification Message so that network can decide if the resources can be made available to transmit an indicated number of RLC Octets before the Cell Reselection command is issued to the wireless device 10. Based on this "RLC_BUFFER_SIZE", the network can provide optimal resource allocation to the wireless device 10 in the current serving cell 12 so that all uplink data 26, 42 is sent before the Packet Cell Change Continue 28 is sent to the wireless device 10.

Figure 4:
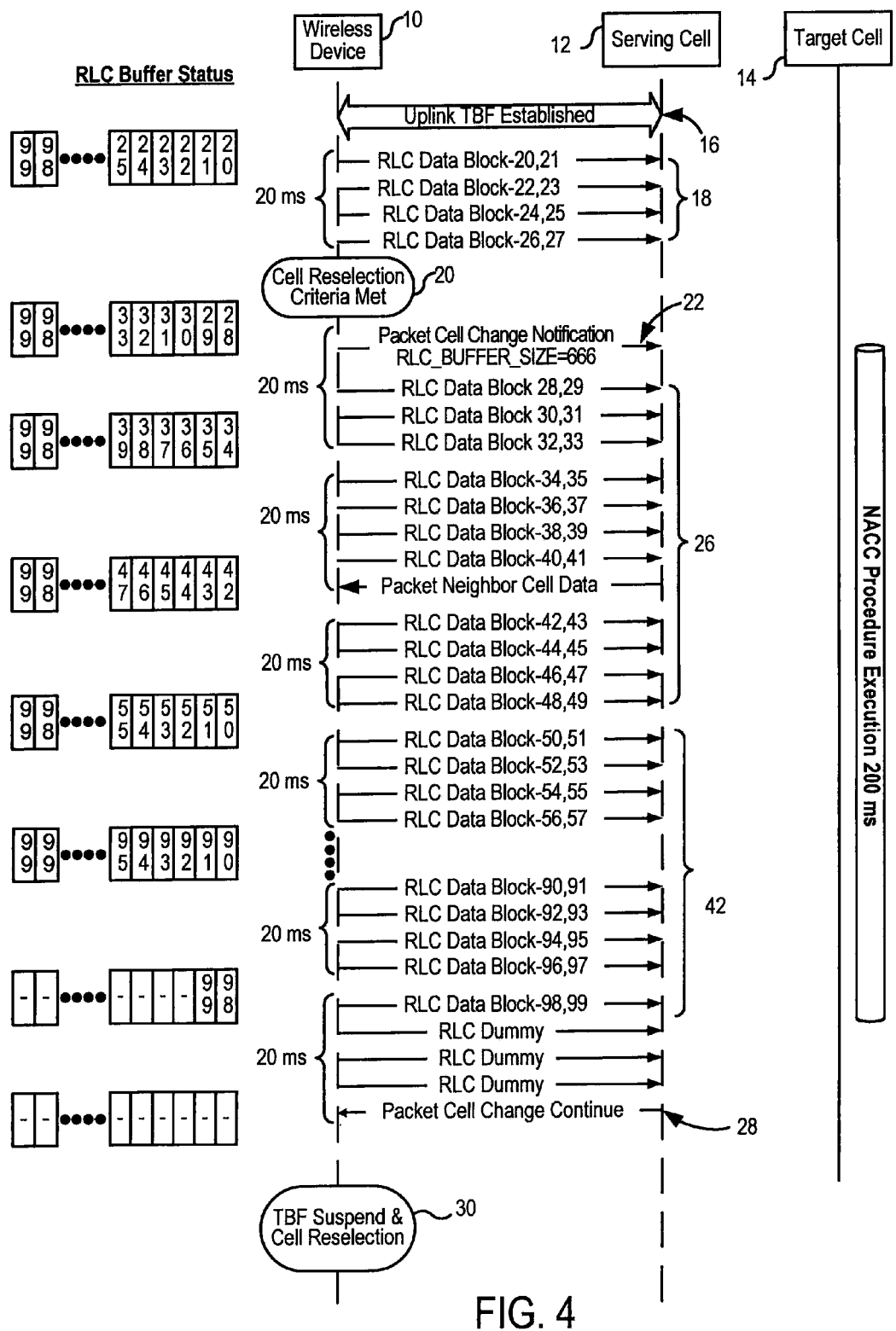
FIG. 4 is a data flow diagram illustrating an example cell reselection process including the use of RLC_BUFFER_SIZE in a Packet Cell Change notification (PCN) message in accordance with the present disclosure.

In particular, the wireless device 10 transmits number of pending octet size to the network in Packet Cell Change notification (PCN) 22. In the example of FIG. 4, there are 28 MCS-9 blocks pending for transmission, which results into buffer size as 72×74=5328 bytes. The wireless device 10 will send RLC_BUFFER_SIZE as (Total buffer size in Bytes)/Scaling Factor (=8), or 5328/8=666. Based on the above allocation requirement, the network delays the "Packet Cell Change Continue" transmission for 200 ms, instead of 60 ms, as described with respect to FIG. 2. Within these 200 ms and same uplink allocation of 4UL slots with MCS-9 scheme, the wireless device 10 is able to transmit all the RLC Data blocks without any impact on latency. Seeing the overall limit of 960 ms for NACC procedure (i.e. from the time the PCN is sent until a PCCO/PCCC/PSHO is received), the network can further optimize the uplink data allocation by performing link adaptation based on given channel quality report in PCN message.

In the case where the network determines that it is likely to require substantially all of the available time for the requested uplink transfer to be complete, and wishes the wireless device to continue to the target cell indicated in the PCN, where it would normally send a PCCC, it may omit to send the PCCC and rely on the timer on the wireless device to trigger autonomous reselection. The network may send the PCCC/PCCO/PS HO Command and include a delay timer indication, to indicate that the wireless device should not perform the mobility/cell change procedure until the indicated time, but should continue operation in the current cell. This increases the possibility of the wireless device completing the uplink transfer before performing the cell change while avoiding the possibility that the wireless device cannot receive the control message sent by the network because, at the time when the network determines the cell change should occur, radio conditions in the serving cell are not sufficient for correct reception and decoding of the PCCO/PS HO/PCCC. This approach may also be used to allow the current maximum time (960 ms) between PCCN and cell change to be exceeded, thereby increasing the possibility to complete the uplink data transfer.

In the case where the wireless device has recently sent a countdown value (CV) indicating that BS_CV_MAX block periods may be sufficient to transfer all of the outstanding uplink data and the RLC_BUFFER_SIZE, if sent, would not indicate a higher amount of outstanding data, the wireless device may omit to include the number of outstanding octets, for example, as indicated in the RLC_BUFFER_SIZE.

For example, in the case of an EGPRS Class 12 MS with 1 Downlink, 4 Uplink slots, a network can serve the support of up to ((960/20)*4*2), or 384 MCS9 RLC/MAC Data blocks in uplink. Based on the capability of the wireless device (Multislot Class, Modulation support, Coding scheme support, GPRS/EGPRS/EGPRS2 support), the network can allocate the resources within the T3208 interval and, hence, avoid the interruption of packet transfer.

For example, Table 1 indicates the amount of traffic or the net RLC/MAC data size that can be allocated based on different wireless device categories during NACC procedure for 900 ms. It is noted that these amounts may be reduced by ACK/NACK information, restrictions due the wireless device's capabilities with respect to transmission and reception concurrently, retransmissions, and the like and should be taken into account by the network.

TABLE 1

| Max UE Capability | Max Uplink Slots Allocation | Number of Blocks in 900 ms | Coding Scheme | Block Size (in bytes) | Total RLC/MAC Data in 900 ms (in bytes) |
| --- | --- | --- | --- | --- | --- |
| EGPRS Class 12 | 4 | 360 | MCS9 | 74 | 26640 |
| EGPRS Class 44 | 5 | 450 | MCS9 | 74 | 33300 |
| EGPRS Class 45 | 6 | 540 | MCS9 | 74 | 39960 |
| EGPRS - 2A Class 45 | 6 | 810 | UAS11 | 64 | 51840 |
| EGPRS - 2B Class 45 | 6 | 1080 | UBS12 | 74 | 79920 |
| EGPRS - 2B Class 29 | 8 | 1440 | UBS12 | 74 | 106560 |

Table 2 lists some examples of the size of very short email & messenger message size.

TABLE 2

| Traffic Type | Downlink IP traffic [bytes] | Uplink IP traffic [bytes] |
|---|---|---|
| Very small Email | 500 | 50 |
| MMS Transfer with JPG picture of 800 × 600 resolution | NA | 50-100 KB |
| UDP based File Transfer of up-to 80 KB in Upload session | NA | 85-100 KB |
| Very short instant message | 250 | 50 |

Thus, from Table 1 and Table 2 it can be readily seen that a variety of traffic between a variety of wireless devices can be accommodated and benefit from the present disclosure.

Support of "RLC_BUFFER_SIZE" field in Packet Cell Notification has following advantages. Packet Transfer mode interruption is avoided for the given amount of data transfer. Hence, UE observes low latency in packet transfer. Also, the present disclosure avoids the unnecessary delay of Cell Reselection in case the amount of RLC_BUFFER_SIZE is low. The network can serve the resource allocation fast and then trigger the Packet Cell Change Continue/Order message to the MS. Furthermore, there is no need to send explicit Packet resource request or Packet Downlink Ack/Nack with Channel Description IE during cell reselection phase to indicate the number of data to be sent and; hence, the present disclosure avoids the waste of useful bandwidth. The information related to remaining RLC octets can be piggybacked with Packet Cell Notification message. Further still, the network can perform link adaptation based on the resource requirements. For example, the network may allocate MCS-9 with a larger number of UL slots for a wireless device with high RLC_BUFFER_SIZE size in good radio conditions, or other appropriate modulation and coding scheme to maximize throughput in the serving cell, for example, based on measurement reports, observed block error rates or bit error rates.

To support the RLC_BUFFER_SIZE, the following code is included to modify the PCN message, as indicated below, based on Release 8 specifications:

```
           { null | 0    bit** = < no string > -- Receiver compatible with earlier release
                  | 1    -- Addition in Rel-9
                        { 0 | 1 < RLC_BUFFER_SIZE_TYPE : bit(1) >
                              <RLC_BUFFER_SIZE : bit (16) >
                              < SCALING_FACTOR : bit (3) > }
< Packet Cell Change Notification message content > ::=
        < Global TFI : < Global TFI IE > >
        { 0 < ARFCN : bit (10) >
            < BSIC : bit (6) >
        | 10           -- Extension in Rel-6 and an escape bit for future extensions of the message added:
           < 3G Target Cell : < 3G Target Cell Struct >> } -- Re-selection with a 3G cell as the preferred target cell
        | 110          -- Extension in Rel-8 for E-UTRAN and an escape bit for future extensions of the message
            { 0 | 1    < ARFCN : bit (10) >
                       < BSIC : bit (6) > }
            { 0 | 1    < 3G Target Cell : < 3G Target Cell Struct >> }
            { 0 | 1    < E-UTRAN Target Cell : < E-UTRAN Target Cell Struct >> }
            { 0 | 1    < E-UTRAN CCN Measurement Report : < E-UTRAN CCN Measurement Report struct >
> }
        ! < Message escape : { 111} bit (*) = <no string> > }
        { 0< BA_USED : bit > | 1 < PSI3_CHANGE_MARK : bit(2) > }
        < PMO_USED : bit >
        < PCCN_SENDING : bit (1) >
        < CCN Measurement Report : < CCN Measurement Report struct > >
        { null | 0 bit** = < no string >      -- Receiver compatible with earlier release
              | 1                             -- Addition in Rel-6
                { 0 | 1    < 3G_BA_USED : bit > }
                < 3G CCN Measurement Report : < 3G CCN Measurement Report struct > >
                { null | 0 bit** = < no string >    -- Receiver compatible with earlier release
                      | 1      -- Addition in Rel-9
                        { 0 | 1 < RLC_BUFFER_SIZE_TYPE : bit(1) >
                              <RLC_BUFFER_SIZE : bit (16) >
                              < SCALING_FACTOR : bit (3) > }
        < padding bits > } };
< CCN Measurement Report struct > ::=
        < RXLEV_SERVING_CELL : bit (6) >
        0              -- The value '1' was allocated in an earlier version of the protocol and shall not be used.
        < NUMBER_OF_NC_MEASUREMENTS : bit (3) >
        {      < FREQUENCY_N : bit (6) >
               { 0 | 1 < BSIC_N : bit (6) > }
               < RXLEV_N : bit (6) > } * (val(NUMBER_OF_NC_MEASUREMENTS)) ;
< 3G Target Cell Struct > ::=
              { 0 | 1 < FDD-ARFCN : bit (14) >                      -- 3G UTRAN FDD
                       { 0 | 1 < Bandwidth_FDD : bit (3) > }
                       < SCRAMBLING_CODE : bit (9) > }
              { 0 | 1 < TDD-ARFCN : bit (14) >                      -- 3G UTRAN TDD
                       { 0 | 1 < Bandwidth_TDD : bit (3) > }
                       < Cell Parameter : bit (7) >
                       < Sync Case : bit > }
              < REPORTING_QUANTITY : bit (6) > ;      -- Measurement Report for 3G target cell
< 3G CCN Measurement Report Struct > ::=           -- Measurement Report for 3G neighbour cells
        <N_3G: bit (3) >
        {      < 3G_CELL_LIST_INDEX : bit (7) >
```

```
        < REPORTING_QUANTITY : bit (6) > } * (val(N_3G + 1 ));
< E-UTRAN Target Cell struct > ::=
    < EARFCN : bit (16) >
    { 0 | 1 < Measurement Bandwidth: bit (3) > }
    < Physical Layer Cell Identity : bit (9) >
    < REPORTING_QUANTITY : bit (6) > ;         -- Measurement Report for E-UTRAN target cell
< E-UTRAN CCN Measurement Report struct > ::=  -- Measurement Report for E-UTRAN neighbour cells
    < E-UTRAN_BA_USED : bit >
    < N_E-UTRAN: bit (2) >
    {   < E-UTRAN_FREQUENCY_INDEX : bit (3) >
        < CELL IDENTITY : bit (9) >
        < REPORTING_QUANTITY : bit (6) > } * (val(N_E-UTRAN + 1 ));
```

The RLC_BUFFER_SIZE (16 bit field) and SCALING_FACTOR (3 bit field) fields indicate the number of RLC data octets that the wireless device wishes to transfer (possibly rounded up). The indicated number of RLC data octets is given by RLC_BUFFER_SIZE*(2^(SCALING_FACTOR)). An RLC_BUFFER_SIZE value of '0' indicates that the wireless device does not provide any information on the TBF size. The wireless device should encode these fields using the smallest possible SCALING_FACTOR value.

The RLC_BUFFER_SIZE_TYPE (1 bit field) bit indicates whether the RLC_BUFFER_SIZE indicates the total amount of data outstanding for the TBF, or, for example, if the mobile expects not to be able to transmit all of the outstanding data before the mobility procedure is performed, an amount that, if performed before the cell change, would provide user-perceived benefits.

For example, if RLC_BUFFER_SIZE=53 and SCALING_FACTOR+1=3, then the indicated number of RLC data octets is 53×2^3=424.

It is noted that the encoding described here to indicate the number of outstanding RLC octets is not limiting. Other representations are possible and within the scope of this disclosure. For example, a single field could be used that contains the number of octets divided by a fixed (standardized) scaling factor. Alternatively, the length of the single field could be increased, for example, to 20 bits.

If the wireless device is operating in NC1 or NC2 mode, in accordance with the present disclosure, while determining Cell Reselection, the network can monitor the measurement reports given by the wireless device and decide more precisely when to trigger the Cell Change Order. The network is not aware of the number of RLC Octets left for the transmission by the wireless device. Thus, the wireless device can transmit "RLC_BUFFER_SIZE" value in Packet Measurement Report while operating in NC2 mode. This value helps the network to control the cell reselection in the same way as described above with respect to FIG. 4.

Because of the regular transmission of Measurement report along with RLC_BUFFER_SIZE from the wireless device side, the network can plan improved resource allocation and trigger cell reselection for the wireless device at the appropriate time based on current load/congestion of the network, wireless device's serving cell channel condition, and required uplink resources. Also, if the wireless device is able to complete the uplink transfer prior to the cell change, it may avoid needing to establish a TBF in the new cell at all, thereby reducing the overall amount of signalling/control traffic required (both sent by the network and the wireless device) associated with the uplink data transmission.

To support RLC_BUFFER_SIZE, the following code is included to modify the Packet Measurement Report message, as indicated below, based on Release 8 specifications:

```
        { 0 | 1 < RLC_BUFFER_SIZE_TYPE : bit(1) >
        <RLC_BUFFER_SIZE : bit (16) >
        < SCALING_FACTOR : bit (3) > }
< Packet Measurement Report message content > ::=
    < TLLI / G-RNTI : bit (32) >
    { 0 | 1 < PSI5_CHANGE_MARK : bit (2) > }
    0 < NC Measurement Report : < NC Measurement Report struct > >
        { null | 0 bit** = < no string >              -- Receiver compatible with earlier release
        | 1                                            -- Additions in release 99 :
            { 0 | 1   { 0 < BA_USED : bit > < 3G_BA_USED : bit > | 1 < PSI3_CHANGE_MARK : bit(2) > }
                    < PMO_USED : bit > }
            { 0 | 1 < 3G Measurement Report : < 3G Measurement Report struct > > }
            { null | 0 bit ** = < no string >          -- Receiver compatible with earlier release
            | 1                                        -- Additions in Rel-5 :
                { 0 | 1 < G-RNTI extension : bit (4) > }
                { null | 0 bit ** = < no string >      -- Receiver compatible with earlier release
                | 1                                    -- Additions in Rel-8 :
                    { 0 | 1 < E-UTRAN Measurement Report : < E-UTRAN Measurement Report struct > > }
                    { 0 | 1 < RLC_BUFFER_SIZE_TYPE : bit(1) >
                    <RLC_BUFFER_SIZE : bit (16) >
                    < SCALING_FACTOR : bit (3) > }
                < padding bits > } } } ;
< NC Measurement Report struct > ::=
    < NC_MODE: bit (1) >
    < RXLEV_SERVING_CELL : bit (6) >
    0       -- The value '1' was allocated in an earlier version of the protocol and shall not be used.
    < NUMBER_OF_NC_MEASUREMENTS : bit (3) >
    {   < FREQUENCY_N : bit (6) >
        { 0 | 1 < BSIC_N : bit (6) > }
```

-continued

```
        < RXLEV_N : bit (6) > } * (val(NUMBER_OF_NC_MEASUREMENTS)) ;
< 3G Measurement Report struct > ::=
    <N_3G: bit (3) >
    {    < 3G_CELL_LIST_INDEX : bit (7) >
         < REPORTING_QUANTITY : bit (6) > } * (val(N_3G + 1 )) ;
< E-UTRAN Measurement Report struct > ::=
    < E-UTRAN_BA_USED : bit >
    < N_E-UTRAN: bit (2) >
    {    < E-UTRAN_FREQUENCY_INDEX : bit (3) >
         < CELL IDENTITY : bit (9) >
         < REPORTING_QUANTITY : bit (6) > } * (val(N_E-UTRAN + 1 )) ;
```

Therefore, the disclosure provides a benefit of piggybacking of information regarding outstanding data to be transmitted or expected load on top of the Packet Cell Change Notification/Packet Measurement Report. This provides better utilization of radio/air interface resources and/or better user experience.

Figure 5:
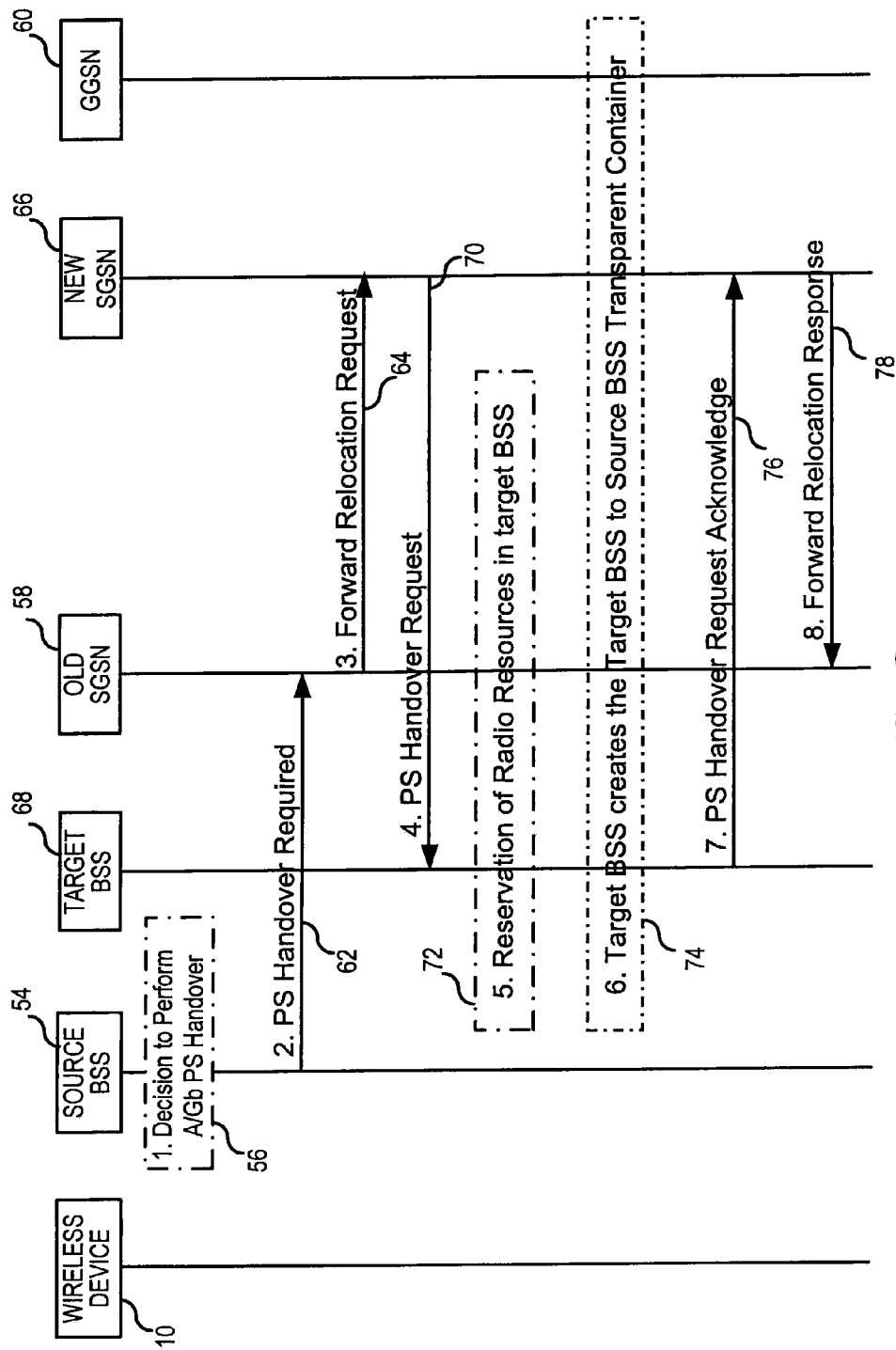
FIG. 5 is a data flow diagram illustrating an example packet switched (PS) Handover Preparation Phase in accordance with the present disclosure.

Turning now to FIG. 5, the present disclosure also applies to PS Handover. One of the responses to a Packet Cell Change Notification or measurement reports is a PS Handover procedure, per 3GPP TS 43.129. In this case, as well as the benefits described above, the addition of the RLC_BUFFER_SIZE field could also be helpful for the target cell to allocate an appropriate amount of uplink resources as part of, or immediately after, PS Handover. In the case of intra-BSS (base station system) handover, where the resource allocations for the source and target cell are performed by the same entity, this would not require any additional signaling other than that described above.

For inter-BSS handover, or inter-RAT (radio access technology) handover, this information can be provided to the target cell as part of the handover preparation phase (see 3GPP TS 43.129). An example of the changes to 3GPP TS 43.129 (based on v.8.0.0) and 48.018 (v.8.1.0) are as follows.

First, as the preparation phase in inter serving GPRS (general packet radio service) Support Node (SGSN) HO, a source BSS 54 decides to initiate a PS handover 56. At this point, both uplink and downlink user data is transmitted via the following: TBFs between wireless device 10 and source BSS 54, BSSGP PFCs tunnel(s) between source BSS 54 and an old SGSN 58, GTP tunnel(s) between old SGSN 58 and a Gateway GPRS Support Node (GGSN) 60. The source BSS 54 sends a PS Handover Required (Old TLLI, Cause, Source Cell Identifier, Target Cell Identifier, Source BSS to Target BSS Transparent Container (RN part), Active PFCs List) message 62 to the old SGSN 58. The old SGSN 58 determines from the Target Cell Identifier that the type of handover is inter-SGSN. In case of inter-SGSN PS Handover, the old SGSN 58 initiates the PS Handover resource allocation procedure by sending a Forward Relocation Request (IMSI, Cause, Source Cell Identifier, Target Cell Identifier, MM Context, PDP Contexts, Packet Flow ID, SNDCP XID parameters, LLC XID parameters, Tunnel Endpoint Identifier for the Control Plane, SGSN Address for the control plane, Source BSS to Target BSS Transparent Container (RN part) in the BSS container, PDP Context Prioritisation) message 64 to a new SGSN 66.

The old SGSN 58 sends all active PDP contexts to the new SGSN 66 indicating the PFIs and the XID parameters related to those PDP contexts. Each PDP context contains the GGSN Address for the User Plane and the Uplink TEID for Data (to this GGSN Address and Uplink TEID for Data the old SGSN and the new SGSN send uplink packets). The MM context contains security related information, for example, used ciphering algorithm and ciphering key as described in 3GPP TS 29.060. The relation between GSM and UMTS security parameters is defined in 3GPP TS 33.102. The Ciphering key used by the old SGSN 58 is reused by the new SGSN 66 until a new authentication procedure is performed. If the new SGSN 66 does not support the indicated ciphering algorithm, the new SGSN 66 has to select a new ciphering algorithm. This new algorithm will be sent transparently from the new SGSN 66 to the wireless device 10. The IOV-UI parameter generated in the new SGSN 66 and used as input to the ciphering procedure will also be transferred transparently from the new SGSN 66 to the wireless device 10.

When the new SGSN receives 66 the Forward Relocation Request message 64, it extracts from the PDP Contexts the associated NSAPIs, SAPIs and PFIs to be used in the new SGSN 66. In the case when the new SGSN 66 does not support the same SAPI and PFI indicated by the old SGSN for a certain NSAPI, the new SGSN 66 shall continue the PS handover procedure only for those NSAPIs for which it can support the same PFI and SAPI as the old SGSN 58 and for which it can allocate resources. All PDP contexts for which no resources are allocated by the new SGSN 66 or for which it cannot support the same SAPI and PFI (i.e. the corresponding NSAPIs are not addressed in the Forward Relocation Response message of the target SGSN), are maintained in the new SGSN 66 and the related SAPIs and PFIs are kept. When this occurs, the packet data transfer corresponding to PDP Contexts for which new SAPI and PFI values are needed are suspended. These PDP contexts may be modified or deactivated by the new SGSN 66 via explicit SM procedures upon the completion of the routing area update (RAU) procedure. When the required PDP, MM, SNDCP and LLC contexts are established and the mapping between NSAPI, SAPI and PFI for each of these PDP Contexts is established, the corresponding packet data transfer can continue.

If, for a given PDP Context, the new SGSN 66 does not receive a PFI from the old SGSN 58, it shall not request a target BSS 68 to allocate TBF resources corresponding to that PDP Context. If none of the PDP Contexts forwarded from the old SGSN 58 has a valid PFI allocated the new SGSN 66 shall consider this as a failure case and the request for PS handover shall be rejected. The old SGSN 58 shall indicate the current XID parameter settings (i.e. those used at the old SGSN 58) to the new SGSN 66. If the new SGSN 66 can accept all XID parameters as indicated by the old SGSN 58, the new SGSN 66 shall create a NAS container for PS HO indicating 'Reset to the old XID parameters'. It is noted that 'Reset to the old XID parameters' means that the LLC and SNDCP layer are reset, except for the LLC XID parameters and SNDCP XID parameters which are re-initialized to the latest negotiated values, and the negotiated compression entities which are re-initialized. Otherwise, the new SGSN 66 shall create a NAS container for PS HO indicating Reset (i.e. reset to default parameters).

The new SGSN 66 sends a PS Handover Request (Local TLLI, Cause, IMSI, Source Cell Identifier, Target Cell Identifier, Source BSS to Target BSS Transparent Container (RN part), PFCs To Be Set Up List, NAS container for PS HO) message 70 to the target BSS 66. The new SGSN shall 66 not request resources for PFCs associated with PDP contexts with a maximum bit rate for uplink and downlink of 0 kbit/s or for which the Activity Status Indicator within the PDP Context indicates that no active PFC exists on the source side. It is noted that the BSS PFCs required to be set up are downloaded to the target BSS 68 from the new SGSN 66, i.e. all information required for PFC creation.

Based upon the ABQP and, if provided in the transparent container, the RLC_BUFFER_SIZE and SCALING_FACTOR, for each PFC, the target BSS 68 makes a decision about which PFCs to assign radio resources 72. The algorithm by which the target BSS 68 decides which PFCs that need resources is implementation specific. Due to resource limitations not all downloaded PFCs will necessarily receive resource allocation. The target BSS 68 allocates TBFs for each PFC that can be accommodated by the target BSS.

The target BSS 68 prepares the Target BSS 68 to Source BSS Transparent Container which contains a PS Handover Command including the CN part (NAS container for PS HO) and the RN part (PS Handover Radio Resources) 74. The target BSS 68 sends the PS Handover Request Acknowledge (Local TLLI, List of Set Up PFCs, Target BSS to Source BSS Transparent Container) message 76 to the new SGSN 66. Upon sending the PS Handover Request Acknowledge message 76, the target BSS 68 is prepared to receive downlink LLC PDUs from the new SGSN 66 for the accepted PFCs.

When the new SGSN 66 receives the PS Handover Request Acknowledge message 76, the Forward Relocation Response (Cause, List of Set Up PFCs, Target BSS to Source BSS Transparent Container in the BSS Container, Tunnel Endpoint Identifier Control Plane, SGSN Address for the control plane, Tunnel Endpoint Identifier Data II) message 78 is sent from the new SGSN 66 to the old SGSN 58. This message 78 indicates that the new SGSN 66 is ready to receive packets forwarded from the old SGSN 58. If the target BSS 68 or the new SGSN 66 failed to allocate resources this shall be indicated in the message 78. The Tunnel Endpoint Identifier Data II, one information for each PDP context, contains the tunnel endpoint of the new SGSN 66 and the IP address of the new SGSN 66 for data forwarding from the old SGSN 58 to the new SGSN 66.

The new SGSN 66 activates the allocated LLC/SNDCP engines as specified in 3GPP TS 44.064 for an SGSN originated Reset or 'Reset to the old XID parameters'. When the old SGSN 58 receives the Forward Relocation Response message 78 and it decides to proceed with the handover, the preparation phase is finished, and the execution phase will follow.

Turning to the execution phase, the second change will be described relating to the source BSS to target BSS transparent container. In GERAN A/Gb mode/GAN mode→GERAN A/Gb mode, the Source BSS to target BSS Transparent Container is sent in the PS Handover Required message 62, the Forward Relocation Request message 64, and the PS Handover Request message 70. The Radio Network part includes of the following: MS RAC; START PS and wireless device RAC (for dual mode mobile stations); and RLC_BUFFER_SIZE (if available) and the associated PFI(s), if the associated RLC_BUFFER_SIZE_TYPE field in the PACKET CELL CHANGE NOTIFICATION indicated that the RLC_BUFFER_SIZE value indicated the total amount of data outstanding for the packet flow (PFC).

Flowing through to 3GPP TS 48.018, Source BSS to Target BSS Transparent Container changes are as follows. This information element contains the information needed in the Target BSS to execute a PS Handover. The element coding and container contents are as follows in Tables 3 and 4, respectively.

TABLE 3

| | |
|---|---|
| Octet 1 | IEI |
| Octet 2, 2a | Length Indicator |
| Octet 3-? | Source BSS to Target BSS Transparent Container Contents coded as defined in table 11.3.79.b |

TABLE 4

| Information Elements | Type/Reference | Presence | Format | Length |
|---|---|---|---|---|
| MS Radio Access Capability | MS Radio Access Capability/11.3.22 | M | TLV | 7-? |
| Inter RAT Handover Info | Inter RAT Handover Info/11.3.94 | O (note 1) | TLV | 3-? |
| Page Mode | Page Mode/11.3.88 | O (note 2, note 3) | TLV | 3 |
| Container ID | Container ID/11.3.89 | O (note 2) | TLV | 3 |
| Global TFI | Global TFI/11.3.90 | O (note 2, note 3) | TLV | 3 |
| PS Handover Indications | PS Handover Indications/11.3.95a | O | TLV | 3 |
| CS Indication | CS Indication/11.3.98 | O (note 3) | TLV | 3 |

(note 1): This information element shall be present if available in the source BSS.
(note 2): This information element shall be present in case of PS Handover from A/Gb mode.
(note 3): This information element shall be present in case of DTM Handover from A/Gb mode.

To accommodate the changes, a row is added to Table 4, as follows: TBF DATA/[type] TBF DATA/11.3.xxx/[Presence] O/[Format] TLV/[Length] 3-?

Also, TBF DATA is adjusted. This information element contains the Packet Flow Identifiers of the PFCs for which the amount of outstanding data, as indicated by the RLC_BUFFER_SIZE. Table 4 following below illustrates the additions.

TABLE 5

| | | |
|---|---|---|
| octet 1 | IEI | |
| octet 2, 2a | Length Indicator | |
| octet 3 | Number of PFCs | |
| Octet 4 | PFI (1) | |
| Octet 5 | RLC_BUFFER_SIZE(1) | |
| Octet 6 | RLC_BUFFER_SIZE(1) | |
| Octet 7 | spare | SCALING_FACTOR (1) |
| Octet ? | PFI (n) | |
| Octet ? | RLC_BUFFER_SIZE (n) | |

TABLE 5-continued

| Octet ? | | RLC_BUFFER_SIZE (n) |
| Octet ? | Spare | SCALING_FACTOR (n) |

The Number of PFCs refers to the number of PFCs for which corresponding information is provided. The "Number of PFCs" parameter is coded as specified above in Table 4. The PFI (Packet Flow Identifier) is coded as the value part of the Packet Flow Identifier information element in 3GPP TS 24.008, not including 3GPP TS 24.008 IEI. In the RLC_BUFFER_SIZE, the lower-numbered octet contains the most significant 8 bits of the RLC_BUFFER_SIZE field as indicated by the wireless device and the higher-numbered octet contains the least significant 8 bits of the RLC_BUFFER_SIZE. The SCALING_FACTOR is a field that includes the SCALING_FACTOR as indicated by the wireless device associated with the indicated PFI.

Figure 6:
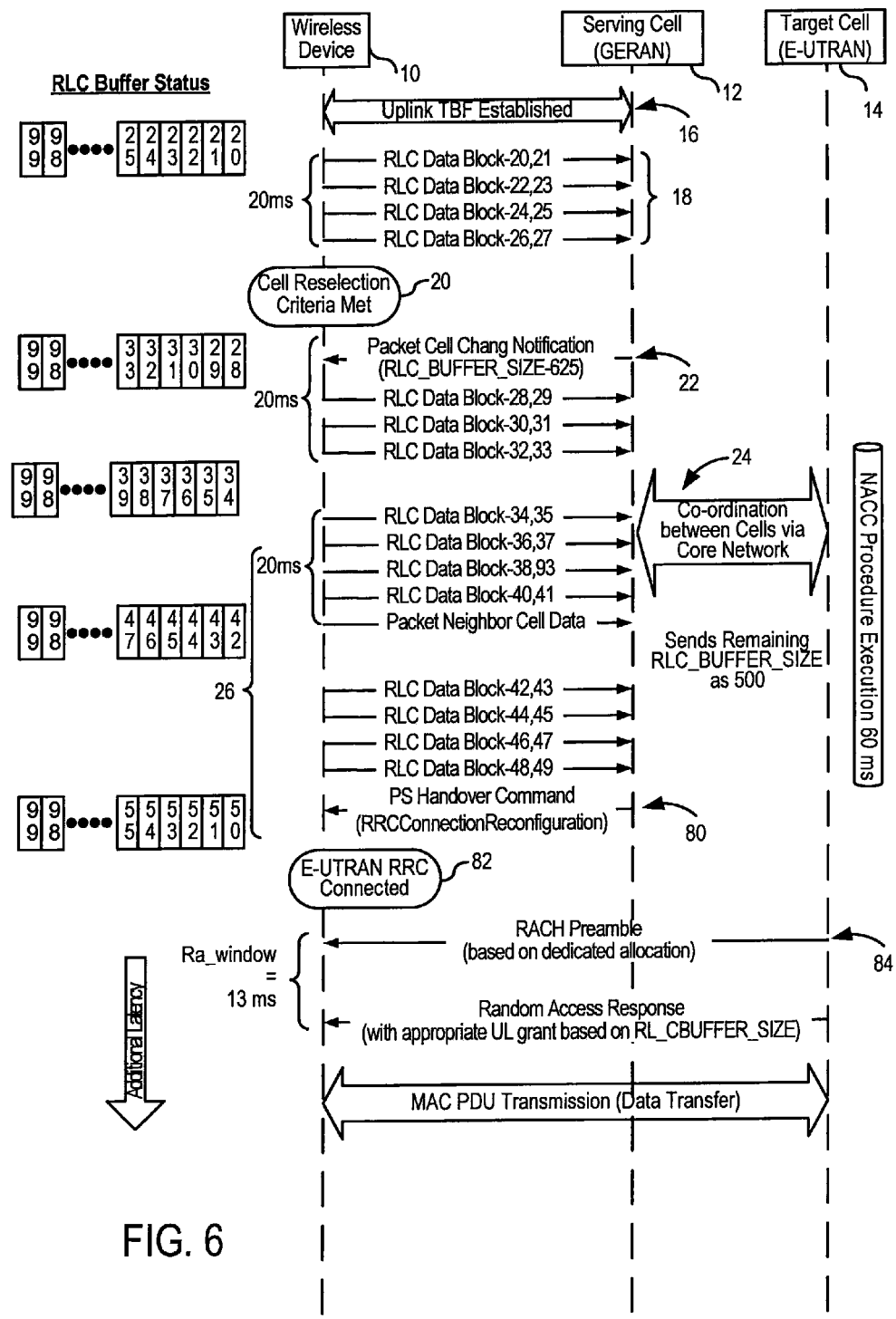
FIG. 6 is an illustration of data flow for handover from A/Gb mode to E-UTRAN.

Turning now to the case of GERAN/E-UTRAN Interworking and FIG. 6, the changes to PS Handover procedures can be illustrated. In this case, the serving cell 12 is a GERAN cell and the target cell 14 is an E-UTRAN cell. The beginning of the process is generally similar to that described above with respect to FIG. 4. Thus, an Uplink TBF is established 16 and RLC data blocks are transferred 18 until a cell reselection criteria is identified 20 by the wireless device 10. Thereafter, the wireless device 10 sends a Pack Cell Change Notification, including the RLC_BUFFER_SIZE 22 and uplink data continues 26 while the cells coordinate 24 via Core Network. References to RLC_BUFFER_SIZE include also the SCALING_FACTOR parameter in the following example. In GERAN, transmission of RLC_BUFFER_SIZE helps in achieving the similar resource allocation technique, like E-UTRAN.

During cell coordination, the serving cell 12 sends the remaining RLC_BUFFER_SIZE to the target cell 14. In E-UTRAN (or LTE), there is a concept of Buffer Status reporting (BSR) based on which the network will determine the uplink resource requirements. BSR is transmitted regularly by the wireless device 10. The following are the key usages. A network can select an appropriate RAT during network controlled cell reselection/hand-over based on the type of uplink resource requirement made. As an example, a wireless device 10 always indicating high RLC_BUFFER_SIZE in its measurement report can be switched to E-UTRAN cell for better QoS support.

Continuing with respect to FIG. 6, the serving cell 12 sends the PS Handover command 80 to the wireless device 10 and the wireless device 10 connects to the E-UTRAN RRC 82. Based on the buffer size provided by the GERAN network, the E-UTRAN network can allocate the required resources 84 without waiting for the explicit BSR report once the wireless device 10 has moved into the E-UTRAN cell. This scheme is quite relevant for PS Handover scenario. Similarly, RLC_BUFFER_SIZE will help in PS Handover from A/Gb mode to A/Gb mode and A/Gb mode to Iu.

Thus, a system and method is provided to allow the network to serve the wireless device with more data transfer instead of performing the immediate cell change. Appropriate allocation of radio resources to the wireless device in the current serving cell and before cell change can help by: reducing packet data transfer latencies for small data sessions by serving the wireless device in the current serving cell itself; performing better load balancing/traffic resources between cells by serving the wireless device appropriately between the current serving cell and the target cell; appropriately allocating uplink resources in the new target cell; and enhanced controlling and avoiding of network congestion.

For example, in the case of a file transfer protocol (FTP), multimedia messaging service (MMS), email, or video or picture share session and standard cell-reselection procedures are followed, there will be significant interruption in the transfer. In these sessions, using the present disclosure, the wireless device can indicate the buffer status to the network via the above-described protocol and may be able to avoid the latencies. Sometimes, the data session completion requires a small acknowledgement messages and without these acknowledgements the peer user cannot terminate the session. There are some protocols like TCP based FTP session which will start the retransmission of the data if the ack is not received on time. Hence, overall any hanging session adds the wastage of resources/bandwidth of the system.

Also, a wireless device's power consumption reduction may be reduced. If the data session is completed quickly, then it is expected that the wireless device will go back to the idle mode faster. Once in idle mode, there will be reduction in overall power consumption. On the other hand, if a wireless device has its data session running in the current serving cell and the cell reselection occurs, then wireless device has to waste more time in signaling and setup of the data path in the new cell, which ultimately not only wastes the radio resources but also increases the overall wireless device's power consumption. Hence, for the same amount of data transfer, cell switching traditionally increases power consumption.

Figure 7:
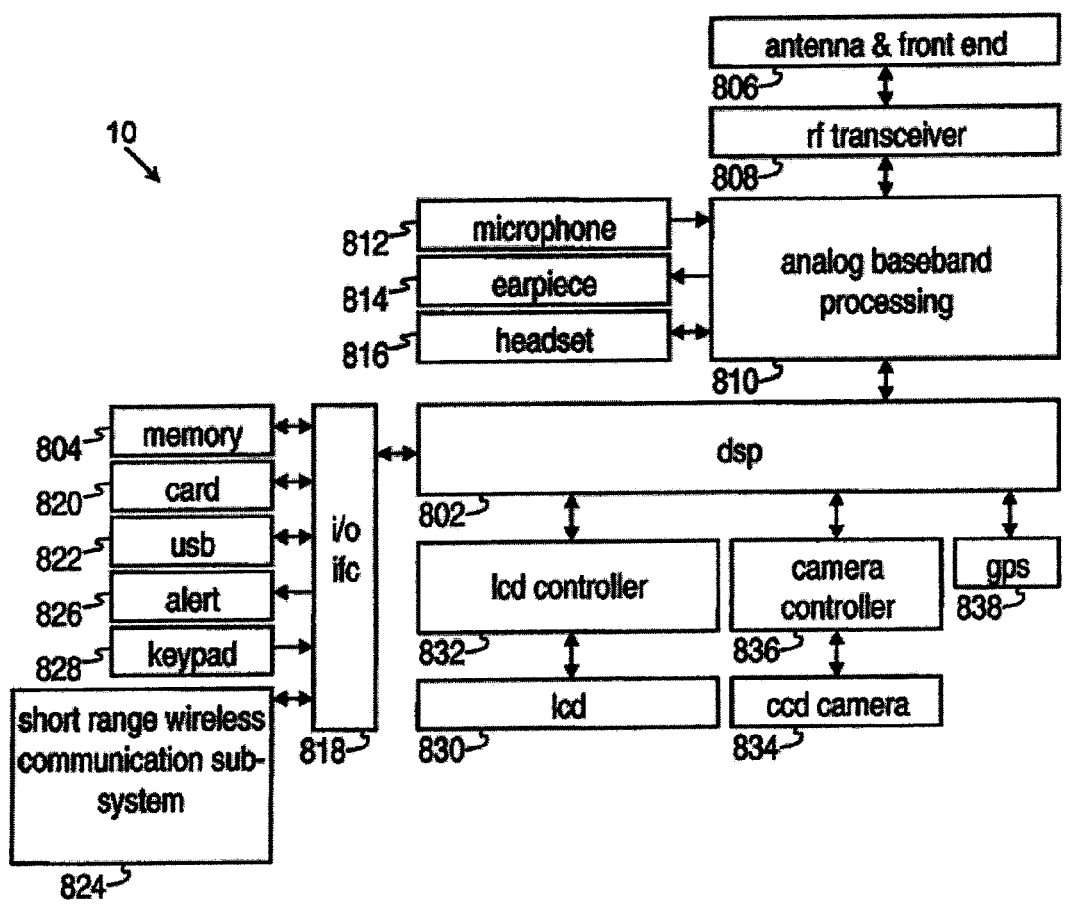
FIG. 7 shows a block diagram of the wireless device.

FIG. 7 shows an example block diagram of the wireless device 10. While a variety of known components of wireless devices 10 are depicted, in an embodiment a subset of the listed components and/or additional components not listed may be included in the wireless device 10. The wireless device 10 includes a processor such as a digital signal processor (DSP) 802, and a memory 804. As shown, the wireless device 10 may further include an antenna and front end unit 806, a radio frequency (RF) transceiver 808, and an analog baseband processing unit 810. In various configurations, wireless device 10 may include additional, optional components as illustrated in FIG. 7. The additional components may include, for example, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the wireless device 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the wireless device 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the wireless device 10 to send and receive information from a cellular network or some other available wireless communications network or from a peer wireless device 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs). The analog baseband processing unit 810 may provide various analog processing of inputs and outputs, for example analog processing of inputs from the microphone 812 and the headset 816 and outputs to the earpiece 814 and the headset 816.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802. The DSP 802 may communicate with a wireless network via the analog baseband processing unit 810.

Figure 8:
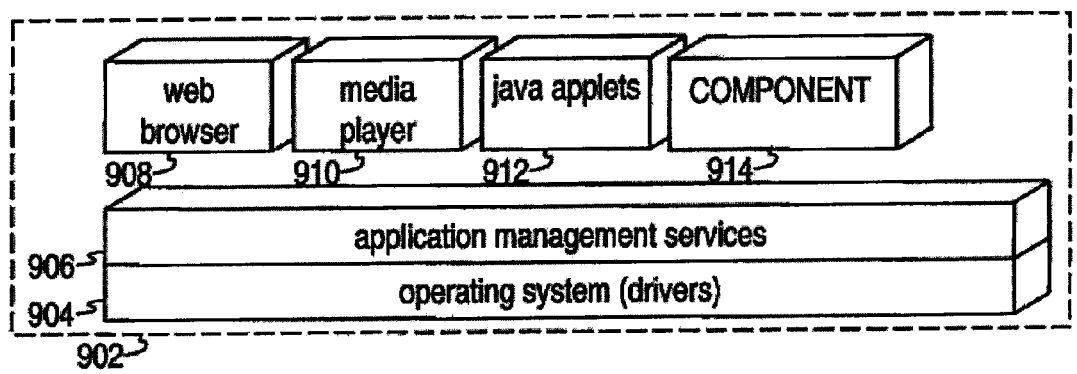
FIG. 8 illustrates a software environment that may be implemented by a processor of a user equipment.

FIG. 8 illustrates a software environment 902 that may be implemented by a processor or controller of the wireless device 10. The software environment 902 includes operating system drivers 904 that are executed by the processor or controller of the wireless device 10 to provide a platform from which the rest of the software operates. The operating system drivers 904 provide drivers for the wireless device hardware with standardized interfaces that are accessible to application software. The operating system drivers 904 include application management services ("AMS") 906 that transfer control between applications running on the wireless device 10. Also shown in FIG. 8 are a web browser application 908, a media player application 910, and Java applets 912.

Figure 9:
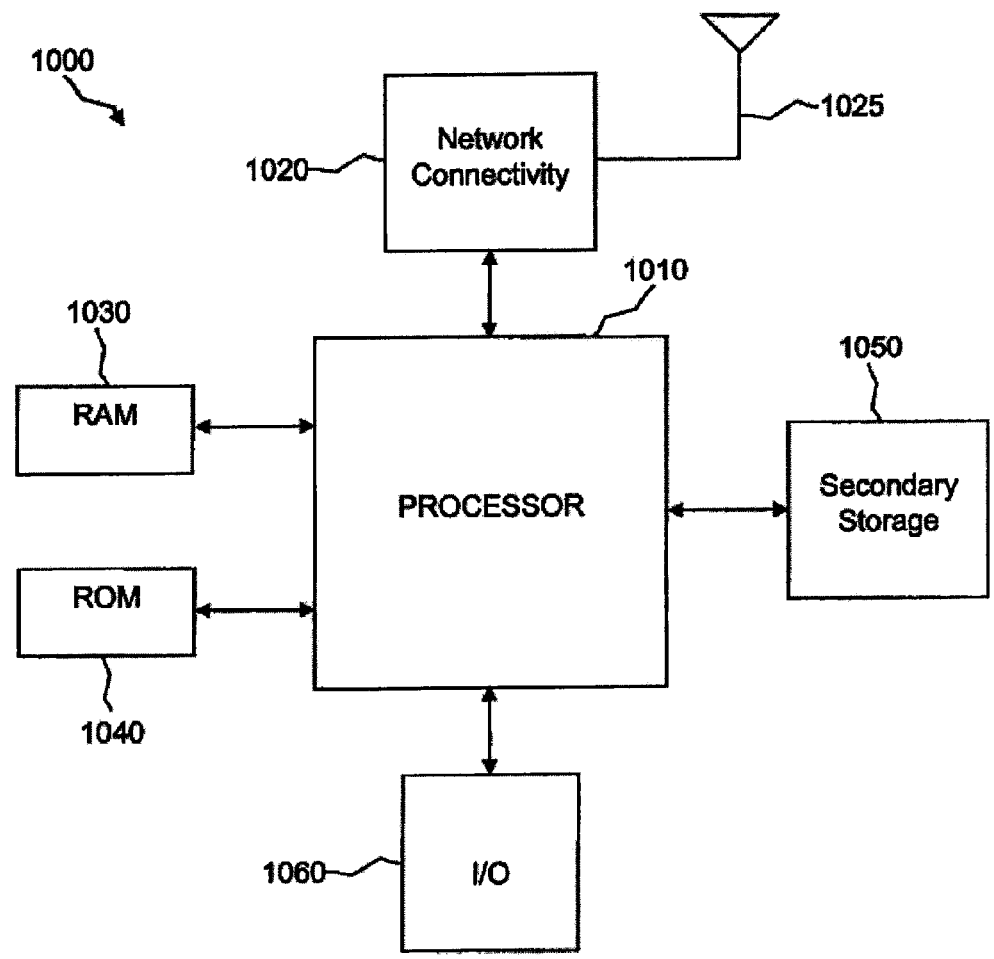
FIG. 9 illustrates an example of a system that includes a processing component suitable for implementing a method for providing continuity for sessions transitioning between networks.

The wireless device 10 includes a processing component such as a DSP that is capable of executing instructions related to the actions described above. FIG. 9 illustrates an example of a system 1000 including one or more of the components that provides the functionality of wireless device 10. System 1000 includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may include one or more transceiver components 1025 capable of transmitting and/or receiving data wirelessly in the form of electromagnetic waves, such as radio frequency signals or microwave frequency signals. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the wireless device 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this disclosure, the following claims are made:

The invention claimed is:

1. A method for performing a cell change for a wireless device associated with a network including a first communications cell and a second communications cell, the method comprising:
   initiating a temporary block flow (TBF) to transfer data through the first communications cell;
   identifying an occurrence of a cell reselection criteria;
   determining a number of pending data blocks to be transmitted through the first communications cell to complete at least a selected portion of the TBF through the first communications cell;
   encoding the number of pending data blocks into a cell change notification;
   transmitting the cell change notification to the network to indicate a remaining amount of data needed to complete at least a selected portion of the TBF through the first communications cell;
   receiving a cell change message from the network; and
   switching to the second communications cell.

2. The method of claim 1 wherein the selected portion of the TBF is the remaining number of data blocks needed to complete the TBF through the first communications cell.

3. The method of claim 1 wherein the selected portion of the TBF is less than the remaining number of data blocks needed to complete the TBF through the first communications cell and is selected to substantially minimize apparent data latency at the wireless device.

4. The method of claim 1 wherein the cell change notification includes a radio link control (RLC) buffer size indicating the remaining number of data blocks needed to complete the TBF.

5. The method of claim 1 wherein the indication of the remaining number of data blocks is a total buffer size in bytes to complete the TBF scaled by a scaling factor.

6. The method of claim 5 wherein the total buffer size in bytes to complete the TBF scaled by a scaling factor indicates a number of RLC data octets needed to complete the TBF.

7. The method of claim 6 wherein the indication of the RLC data octets is given by RLC_BUFFER_SIZE multiplied by two raised to a power of the scaling factor.

8. The method of claim 7 wherein an RLC_BUFFER_SIZE value of '0' indicates that the wireless device does not provide any information on TBF size.

9. The method of claim 7 wherein the indication of the remaining number of data blocks includes an RLC_BUFFER_SIZE_TYPE bit indicating that the selected portion of the TBF is a selected one of the remaining number of data blocks needed to complete the TBF through the first communications cell and less than the remaining number of data blocks needed to complete the TBF through the first communications cell and selected to substantially minimize apparent data latency at the wireless device.

10. The method of claim 1 wherein switching to the second communications cell is performed according to a Network Assisted Cell Change (NACC) mode.

11. The method of claim 1 further comprising, before receiving an cell change message from the network, completing at least the selected portion of the TBF through the first communications cell using the remaining number of data blocks.

12. The method of claim 1 wherein communicating a cell change notification to the network further includes providing an indication of mobility of the wireless device.

13. A method for performing a cell reselection with a wireless device associated with a network including a first communications cell and a second communications cell, the method comprising:
   receiving a temporary block flow (TBF) including a series of data blocks from the wireless device through the first communications cell;
   receiving measurement reports from the wireless device through the first communications cell, the measurement reports including an identification of a number of pending data blocks to be transmitted through the first communications cell;
   using the identification of the number of pending data blocks encoded in the measurement reports received from the wireless device to determine, determining a remaining number of data blocks needed to complete the TBF through the first communications cell;
   communicating a cell change order after receiving at least a selected portion of the TBF through the first communications cell; and
   connecting the wireless device to the second communications cell.

14. The method of claim 13 wherein the measurement report includes an RLC_BUFFER_SIZE value encoding the number of pending data blocks.

15. The method of claim 14 wherein the RLC_BUFFER_SIZE value is a total buffer size in bytes to complete the TBF scaled by a scaling factor.

16. The method of claim 15 wherein the total buffer size in bytes to complete the TBF scaled by a scaling factor indicates a number of RLC data octets needed to complete the TBF.

17. The method of claim 13 wherein the selected portion of the TBF is the remaining number of data blocks needed to complete the TBF through the first communications cell.

18. The method of claim 13 wherein the selected portion of the TBF is less than the remaining number of data blocks needed to complete the TBF through the first communications cell and is selected to substantially minimize apparent data latency at the wireless device.

19. The method of claim 13 wherein connecting the wireless devices is performed according to a Network Controlled Cell Change (NACC) mode.

20. The method of claim 13 further comprising estimating a mobility of the wireless device using the measurement reports.

21. A method for performing a cell reselection with a wireless device associated with a network including a first communications cell and a second communications cell, the method comprising:
- initiating a temporary block flow (TBF) to transfer a series of data blocks through the first communications cell;
- identifying an occurrence of a cell reselection criteria;
- determining a number of pending data blocks to be transmitted through the first communications cell to complete at least a selected portion of the TBF through the first communications cell;
- encoding the number of pending data blocks into a cell change notification;
- transmitting the cell change notification to the network to indicate a remaining number of data blocks needed to complete at least a selected portion of the TBF through the first communications cell;
- receiving a handoff command from the network; and
- connecting to the second communications cell.

22. The method of claim 21 wherein the selected portion of the TBF is one of the remaining number of data blocks needed to complete the TBF through the first communications cell and less than the remaining number of data blocks needed to complete the TBF through the first communications cell and is selected to substantially minimize apparent data latency at the wireless device.

23. The method of claim 21 wherein the cell change notification includes a radio link control (RLC) buffer size indicating the remaining number of data blocks needed to complete the TBF.

24. The method of claim 21 wherein the first communications cell operates according to a GERAN protocol and the second communications cell operates according to a E-UTRAN protocol.

25. The method of claim 21 further comprising, before receiving the handoff command from the network, completing at least the selected portion of the TBF through the first communications cell using the remaining number of data blocks.

* * * * *